United States Patent
Boyina et al.

(10) Patent No.: US 7,848,268 B2
(45) Date of Patent: Dec. 7, 2010

(54) FAULT TOLERANCE IN WIRELESS NETWORKS

(75) Inventors: Ramakrishua Boyina, Bangalore (IN); Jagadeesh Brahmajosyula, Guntur (IN); Vinayak S. Kore, Bangalore (IN); Arun V. Mahasenan, Bangalor (IN); Srivastava Namburi, Hubli (IN); Amit S. Punpale, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1045 days.

(21) Appl. No.: 11/604,637

(22) Filed: Nov. 27, 2006

(65) Prior Publication Data

US 2008/0123553 A1    May 29, 2008

(51) Int. Cl.
*H04B 7/00* (2006.01)
(52) U.S. Cl. .................................... 370/310
(58) Field of Classification Search ............... 370/310
See application file for complete search history.

(56) References Cited

U.S. PATENT DOCUMENTS

2008/0008088 A1*  1/2008  Nagarajan et al. ............ 370/220

OTHER PUBLICATIONS

"Part 11: Wireless LAN Medium Access Control (MAC) and Physical Layer (PHY) Specifications", ANSI/IEEE Std 802.11, 1999 Edition (R2003), (1999),1-528.

"Putting the air space to work : Real-world benefits of enterprise-wide RF intelligence", *Alcatel White Paper*, (Mar. 2004),1-11.

Gandhi, R. , "Tolerance to access-point failures in dependable wireless local-area networks", *Ninth IEEE International Workshop on Object-Oriented Real-Time Dependable Systems*, 2003. Proceedings., (2003),136-143.

Su, W. W., et al., "An adaptive and fault-tolerant gateway assignment in sensor networks", *2004 IEEE International Conference on Mobile Ad-hoc and Sensor Systems*, (2004),576-578.

Virendra, M. , et al., "SAWAN: a survivable architecture for wireless LANs", *Proceedings. Third IEEE International Workshop on Information Assurance*, (2005),71-82.

* cited by examiner

*Primary Examiner*—Rafael Pérez-Gutiérrez
*Assistant Examiner*—Munjal Patel
(74) *Attorney, Agent, or Firm*—Schwegman, Lundberg & Woessner P.A.

(57) ABSTRACT

A network includes a plurality of logical access entities. Each access entity includes one or more communication interfaces. The network further includes a plurality of logical node entities. Each logical node entity includes one or more communication interfaces that are configured to wirelessly communicate in a redundant manner with any of the logical access entities. In an embodiment, a communication degradation in the network is assessed, and the network is configured as a function of that assessment to provide fault tolerance within the network.

9 Claims, 9 Drawing Sheets (PRIOR ART)
FIG. 1

| SUBSYSTEM/ COMPONENT | POTENTIAL FAILURE MODE | POTENTIAL FAILURE EFFECTS | POTENTIAL CAUSES |
|---|---|---|---|
| ACCESS POINT (AP) FAILURE | AP NIC FAILS | LOSS OF BSS CONTROLLED BY THAT AP | NIC HARDWARE/ FIRMWARE FAILURE/ MALFUNCTIONING |
| | AP HARDWARE FAILURE/ MALFUNCTIONING | LOSS OF BSS CONTROLLED BY THAT AP | HARDWARE AGEING, HARSH ENVIRONMENTS |
| | AP SOFTWARE/ FIRMWARE FAILURE/ MALFUNCTIONING | LOSS OF BSS CONTROLLED BY THAT AP | EXCEPTIONS, RUN TIME ERRORS |
| | ANTENNA FAILURE | LOSS OF BSS | OPERATIONAL ENVIRONMENT & EXTERNAL FORCES DAMAGING |
| WIRELESS NODE FAILURE | NODE NIC FAILS | LOSS OF THE NODE FROM THE NETWORK | NIC HARDWARE/ FIRMWARE FAILURE/ MALFUNCTIONING |
| | NODE HARDWARE FAILS/ MALFUNCTIONS | LOSS OF THE NODE FROM THE NETWORK | PROCESSOR OR OTHER RELATED HARDWARE FAILURE |
| | NODE SOFTWARE/ FIRMWARE FAILS/ MALFUNCTIONS | LOSS OF NODES FUNCTIONALITY AND ITS SERVICES | SOFTWARE CORRUPTION, RUN TIME ERRORS |
| | ANTENNA FAILURE | LOSS OF BSS | OPERATIONAL ENVIRONMENT & EXTERNAL FORCES DAMAGING |
| COMMUNICATION MECHANISM | LINK BETWEEN A NODE AND AP FAILS/ DEGRADES | MIGHT RESULT IN THE LOSS OF ENTIRE BSS OR THE PARTIAL LOSS OF THE COMMUNICATION WITH NODES | INTERFERENCE, FAILURE OF NIC ON AP OR NODE, CONGESTION, TRAFFIC DENSITY ETC |
| | PATH BETWEEN 2 NODES FAILS/ DEGRADES | LOSS OF COMMUNICATION BETWEEN THE NODES | LINK FAILURE, INTERMEDIATE AP FAILURE |

*FIG. 2*

| FEATURES → / OPTIONS ↓ | NODE WITH 1 NIC | NODE WITH 2 NICs | AP WITH 1 NIC | AP WITH 2 NICs | RED AP (1NIC/AP) | RED APs (2NIC/AP) | DATA REPLICATION | WHAT IT OFFERS? |
|---|---|---|---|---|---|---|---|---|
| OPTION 1 | YES | – | YES | – | – | – | – | STANDARD SUPPORTED 802.11 ARCHITECTURE, PROVIDES NO FAULT TOLERANCE |
| OPTION 2 | YES | – | – | – | YES | – | – | AP DIVERSITY |
| OPTION 3 | YES | – | – | YES | – | – | – | AP LINK DIVERSITY |
| OPTION 4 | YES | – | – | – | – | YES | – | AP, DATA, CHANNEL AND LINK DIVERSITY |
| OPTION 5 | – | YES | YES | – | – | – | YES | NODE LINK DIVERSITY |
| OPTION 6 | – | YES | – | – | YES | – | YES | DATA, NODE LINK AND AP DIVERSITY |
| OPTION 7 | – | YES | – | YES | – | – | YES | CHANNEL, LINK(BOTH NODE AND AP) AND DATA DIVERSITY |
| OPTION 8 | – | YES | – | – | – | YES | YES | CHANNEL, LINK, DATA, AND AP DIVERSITY |

FAULT TOLERANCE IN WIRELESS NETWORKS

TECHNICAL FIELD

Various embodiments relate to networks, and in an embodiment, but not by way of limitation, to fault tolerance in wireless networks.

BACKGROUND

The availability of wireless networks has increased tremendously over the last decade or so. Wireless networks offer, among other features, increased convenience to its users. One example of a wireless network is an 802.11x based network.

Figure 1:
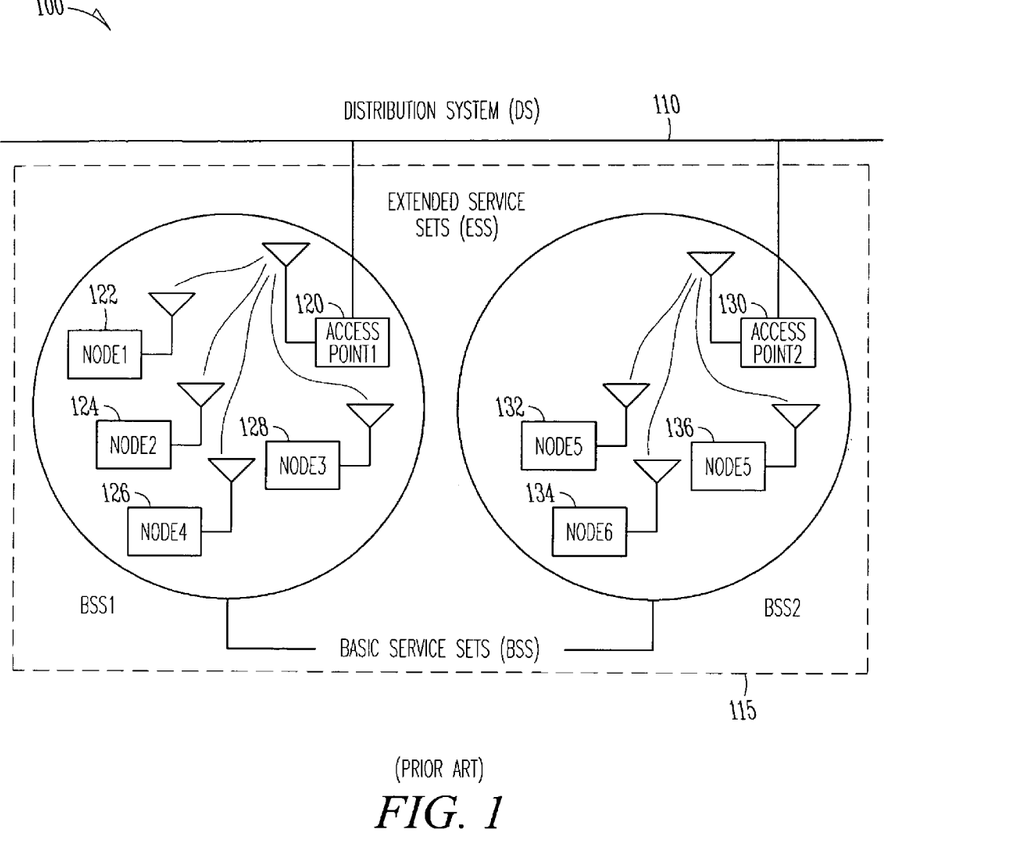
FIG. 1 illustrates an example embodiment of master-slave wireless network.

The basic architecture of an 802.11x based network is shown in FIG. 1. The basic building blocks of 802.11x based networks are referred to as Basic Service Sets (BSS). The BSS consists of an Access Point (AP) or similar logical access entity with several nodes, stations, or other logical node entities wirelessly connected to it. Because of the limitations in the physical layer, the direct node to node distance that may be supported is limited. To overcome this limitation, several BSSs may come together to form an extended network. This interconnection is basically done using the distribution system (DS) as shown in FIG. 1, and 802.11x logically separates the wireless medium from the Distribution System Medium (DSM). The DS and the BSS can be leveraged to create larger networks referred to as Extended Service Sets (ESS). The Logical Link Control (LLC) views the ESS as an independent or single BSS (IBSS) network. Nodes within an ESS may communicate with each other and they may move from one BSS to another, and this movement is transparent to the LLC.

While an 802.11x network and other wireless network protocols permit much flexibility in their use, and support bandwidths ranging from a few Kbps to tens of Mbps, issues still remain related to the robustness and reliability of these wireless networks. Wireless networks would thus benefit from protocols and architectures that address robustness and reliability.

SUMMARY

A network includes a plurality of logical access entities. Each access entity includes one or more communication interfaces. The network further includes a plurality of logical node entities. Each logical node entity includes one or more communication interfaces that are configured to wirelessly communicate in a redundant manner with any of the logical access entities. In an embodiment, a communication degradation in the network is assessed, and the network is configured as a function of that assessment to provide fault tolerance within the network.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/ apparatus could perform operations different than those discussed with reference to the flow diagrams.

One or more embodiments of the present disclosure provide a fault tolerant wireless network. Consequently, wireless networks that are more robust and reliable may be installed and/or deployed.

In one or more embodiments, modifications are made to wireless architectures known in the art to make those wireless networks more robust and resilient to communication degradations. The modified systems and networks are capable of identifying failure states arising due to communication degradation factors, and thus make these systems and networks tolerant to these faults when they occur. While in this disclosure the well known IEEE 802.11x WLAN standard in a master-slave mode is used as an example, the present disclosure may easily be applied to other wireless networks that operate in master-slave mode or hierarchical mode and support multiple non-overlapping channels and multiple accesses on the same channel (like Code Division Multiple Access (CDMA) or Time Division Multiple Access (TDMA)).

It is well known that due to the fundamental nature of a medium in wireless networks the transmission characteristics are non-deterministic. Due to this inherent drawback, the wireless communication link is susceptible to failures, thus making it unreliable. The received signal strength in such wireless networks depends on several factors such as channel interference, signal fading, and reflecting obstructions, just to name a few. Apart from this, there are several other factors that add to the unreliable nature of the communication channel such as congestion in the link (due to other wireless systems that coexist in the same frequency spectrum or other nodes contending for the channel), or failure of the Access Points (APs) and interface devices. It is noteworthy that one of the resulting states of communication degradation in wireless networks is the system/sub-system failure.

An embodiment approaches these reliability and robustness problems by incorporating consequential awareness in the system/network with respect to the failure modes arising due to communication degradation, provides methods for fault identification, and thus induces fault tolerance into the system.

The fault tolerance approaches of this disclosure address such issues as link failure, AP failure, failure of the wireless interface on AP and wireless nodes, and tolerance to congestion in the links, just to name a few. These issues are addressed in several manners including path diversity, channel and link diversity, data diversity, AP diversity, and interface diversity, which result in various architectural alternatives that achieve robust and fault resilient wireless communication networks.

Figure 2:
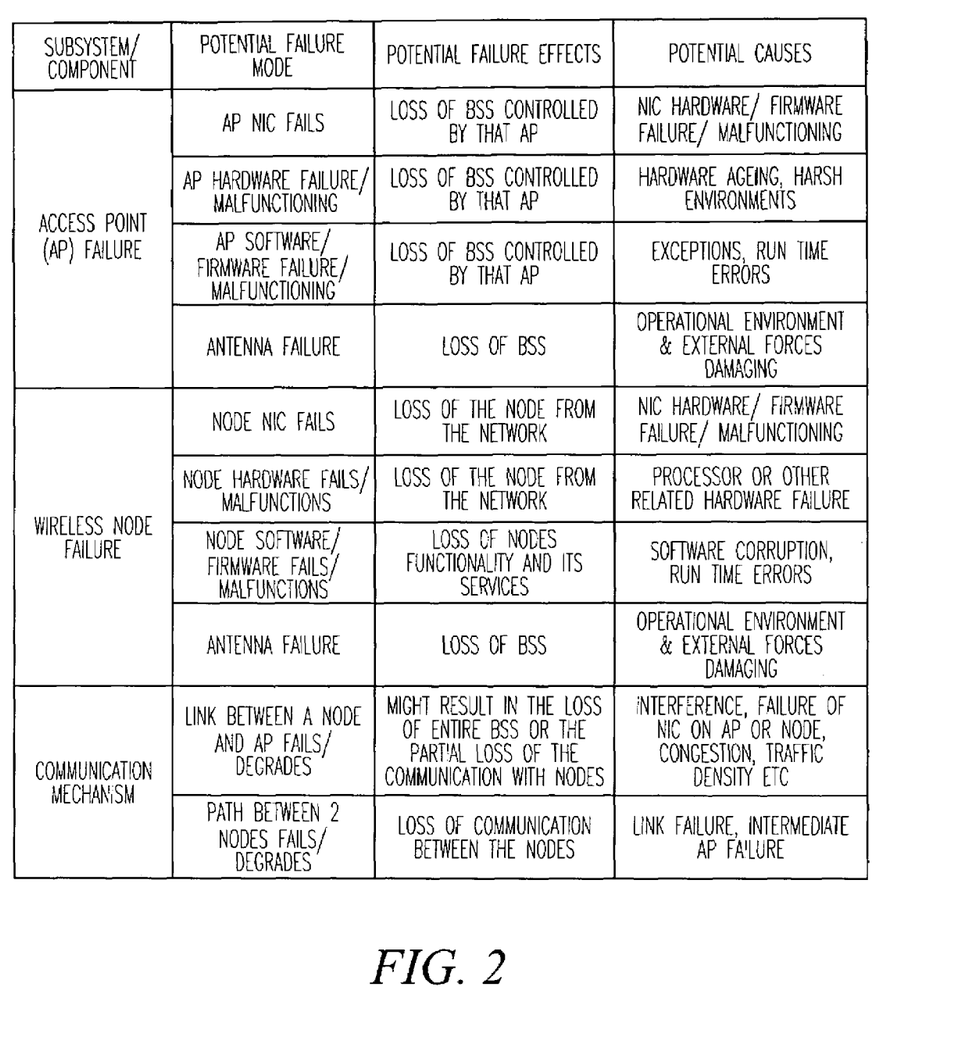
FIG. 2 is a table listing possible modes in which faults may arise in typical wireless networks.

FIG. 2 is a table of possible modes in which faults may arise in typical wireless networks, such as the example network depicted in FIG. 1. FIG. 2 lists potential sub-system failures, the possible causes of these sub-system failures, and the impact of these failures on the communication between sub-systems. With reference to FIG. 1, typical sub-systems of wireless networks would be an AP (master), a wireless node (slave node), and the communication between the master and slave nodes. The several approaches and techniques described herein address one or more of the failure modes outlined in FIG. 2.

The present disclosure incorporates features such as consequential awareness of communication degradation amongst the sub-systems in wireless networks and also provides techniques to tolerate related failures. That is, an architecture is disclosed that provides the capability to identify a degradation of communication in a wireless network. The architecture further provides for fault tolerance and fault avoidance in the event of a sub-system failure.

Figure 3:
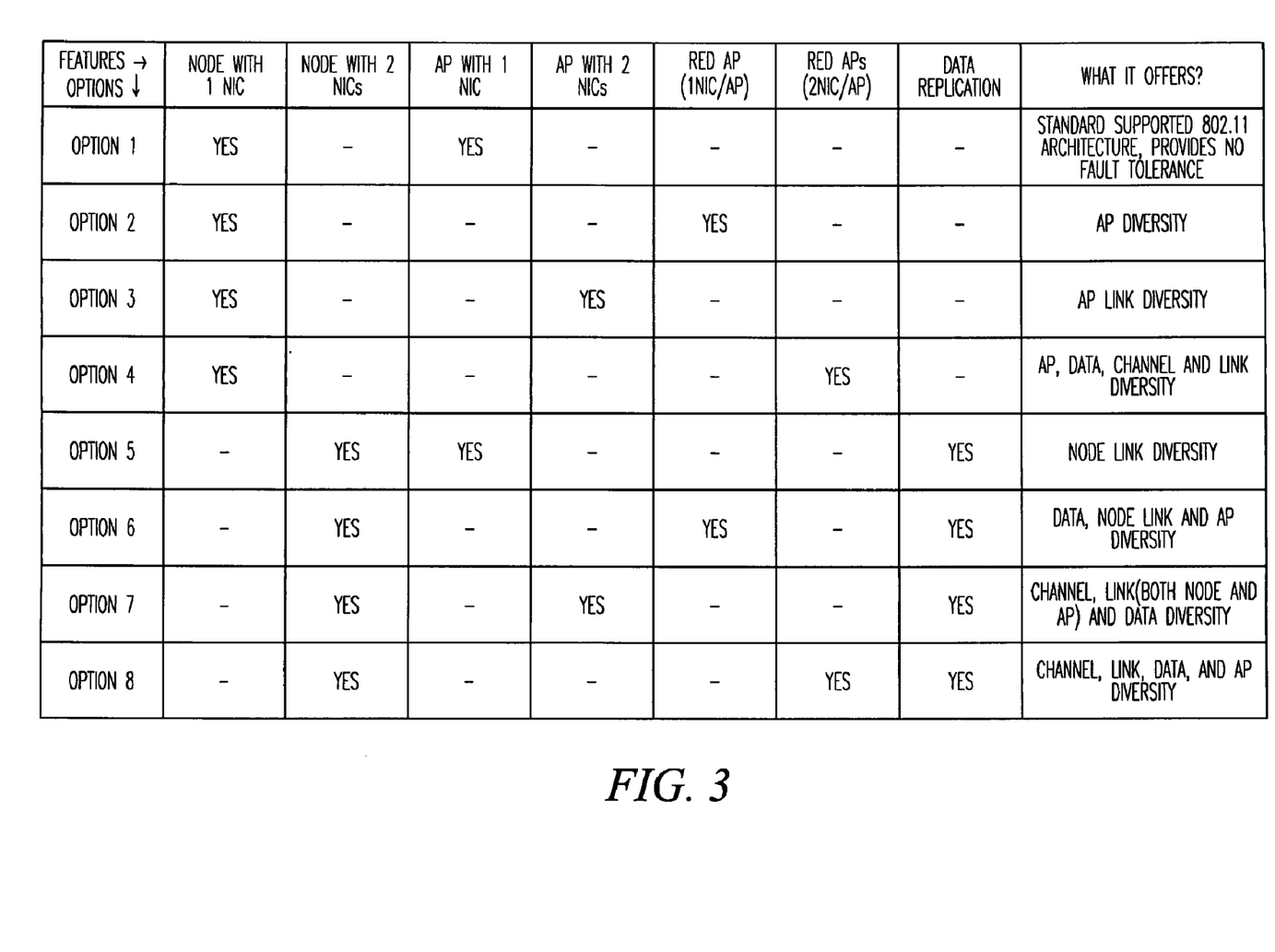
FIG. 3 is a table listing possible redundancies that can be provided to overcome the various failure modes listed in FIG. 2, for a master-slave wireless network as depicted in FIG. 1.

In one or more embodiments, such fault tolerance is achieved through redundancy. For example, there may be link or channel redundancy between the APs and the wireless nodes, redundancy of the APs, and redundancy of network interface cards (NIC) on the nodes and the APs. A combination of all of these are illustrated in FIG. 3, and result in a variety of options, each one of which results in a different level of robustness and fault resilience. Other features of fault avoidance and communication degradation awareness are provided through middleware, which is a software algorithm that exists on the wireless nodes in the system.

Referring to FIG. 3, the various possible failure modes are interface failures (NIC card failures on both APs and Nodes), link failure between the nodes and APs, communication channel corruption between the nodes and the APs, data losses, and congestion over the links between the APs and nodes. A combination of the various features listed across the top of FIG. 3 (Node with 1 NIC, Node with 2 NICs, etc.) results in different architectures which address the various failure modes.

Figure 4:
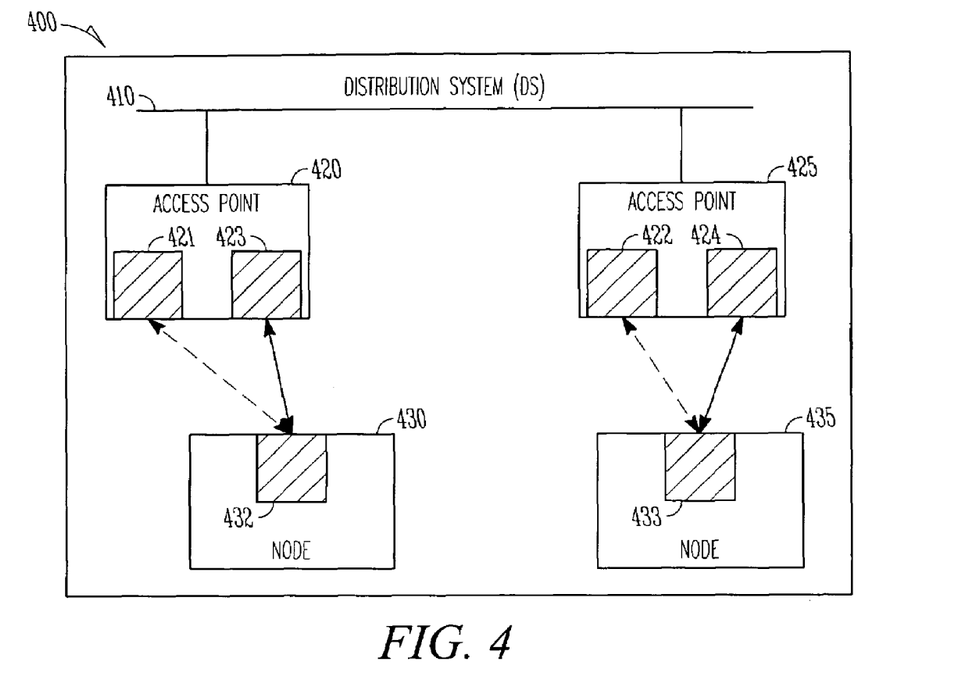
FIGS. 4-10 illustrate example embodiments of fault tolerant architectures of wireless networks.

Option 3 in FIG. 3 is illustrated in diagrammatic form in FIG. 4. FIG. 4 illustrates a portion of a network 400 including a distribution system 410, access points 420 and 425, and nodes 430 and 435. The access points 420 and 425 may be referred to as logical access entities, and the nodes 430 and 435 may be referred to as logical node entities. The access points and the nodes may both be referred to as logical communication entities. Each access point has a first NIC 421, 422 and a second NIC 423, 424. Each node has a single NIC 432, 433. The NICs may also be referred to as communication interfaces. Consequently, every wireless node is equipped with only one NIC, whereas the access points are equipped with a primary NIC and a secondary NIC. This architecture addresses the issue of failure of the NIC on the APs. The two NICs on any AP can operate over the same frequency channel or on different channels. The two nodes in this architecture communicate with each other over the DS. The available (redundant) paths between node 430 and 435 include the following:

Path1: Node430→AP NIC 421→AP NIC 422→Node 435
Path2: Node430→AP NIC 421→AP NIC 424→Node 435
Path3: Node430→AP NIC 423→AP NIC 422→Node 435
Path4: Node430→AP NIC 423→AP NIC 424→Node 435

Figure 5:
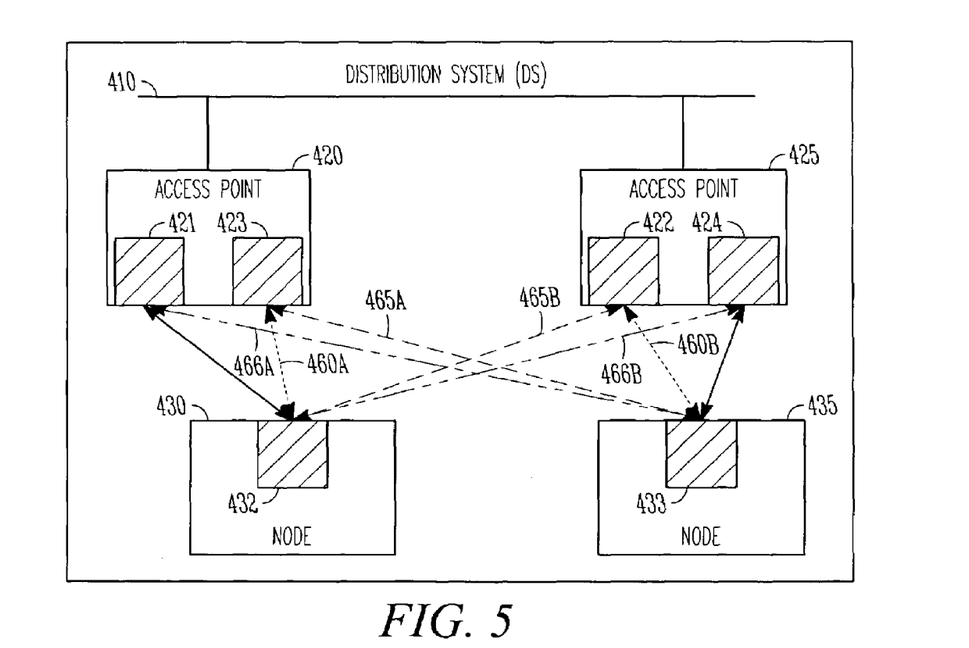

FIG. 5 illustrates option 4 from the table in FIG. 3. Like in FIG. 4, each access point 420 and 425 have two NICs 421, 423 and 422, 424 respectively. Similarly, each node 430 and 435 have a single NIC 432 and 433 respectively. The APs 420 and 425 in FIG. 5 act as redundant APs in the sense that their coverage areas intersect with one another, i.e. the BSSs of access point 420 and access point 425 overlap each other. The architecture of FIG. 5 provides tolerance to AP failure and also to faults arising due to the failure of the NICs on the APs. This approach also handles the situation arising due to the failure of the communication channel between the APs and the nodes. Like the architecture of FIG. 4, the two NICs on the APs might operate either on the same channel or on different channels.

As shown in FIG. 5, both the NICs 421 and 423 on AP 420, and NICs 422 and 424 on the AP 425, can operate on two non-overlapping channels. The nodes 430, 435 can associate to their preferred AP over these channels (preferably the nodes 430, 435 should operate on non-overlapping channels). In the event of a failure of one of the APs 420, 425, the nodes associated with that AP can switch to the redundant AP on the same channel. This is illustrated by the dashed lines 465A, 465B in FIG. 5. Another option for the node in the event of a failure of its preferred AP is to switch its operating frequency to the other non-overlapping channel and associate itself with the redundant AP (as shown by the dash-dot lines 466A, 466B in FIG. 5). In the event that one of the NICs on its preferred AP fails, the node can switch its operating channel and associate with the redundant NIC of its preferred AP operating over another channel as shown by the dotted lines 460A, 460B in FIG. 5.

Thus, utilizing the approach in FIG. 5, the various possible paths between node 430 and node 435 include:

Path1: Node430→AP NIC 421→AP NIC 422→Node 435
Path2: Node430→AP NIC 421→AP NIC 424→Node 435
Path3: Node430→AP NIC 423→AP NIC 422→Node 435
Path4: Node430→AP NIC 423→AP NIC 424→Node 435
Path5: Node430→AP NIC 422→Node 435
Path6: Node430→AP NIC 424→Node 435
Path7: Node430→AP NIC 421→Node 435
Path8: Node430→AP NIC 423→Node 435

Figure 6:
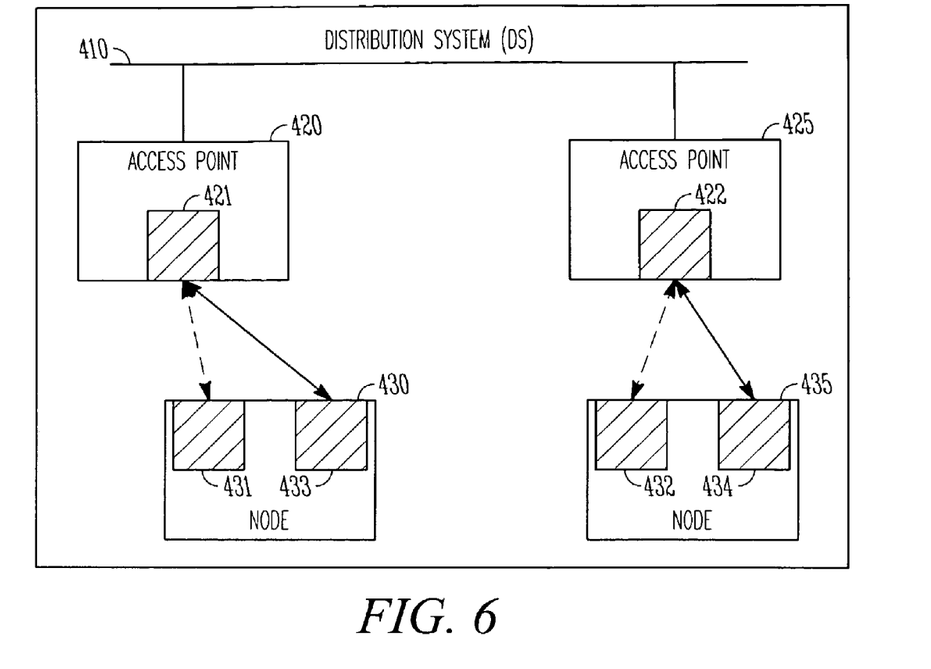

Another approach is given by option 5 in FIG. 3. In Option 5, each AP has only one NIC, while on the other hand the nodes are equipped with dual NICs—one referred to as a primary NIC and the other referred to as a secondary NIC. This is illustrated in FIG. 6. The secondary NIC takes over the functionality of the primary NIC in the event of failure of the primary NIC. This approach provides node level link diversity and node NIC diversity. The different paths between node 430 and node 435 include the following:

Path1: Node430 NIC 431→AP NIC 421→AP NIC 422→Node 435 NIC 432
Path2: Node430 NIC 431→AP NIC 421→AP NIC 422→Node 435 NIC 434
Path3: Node430 NIC 433→AP NIC 421→AP NIC 422→Node 435 NIC 432
Path4: Node430 NIC 433→AP NIC 421→AP NIC 422→Node 435 NIC 434

Figure 7:
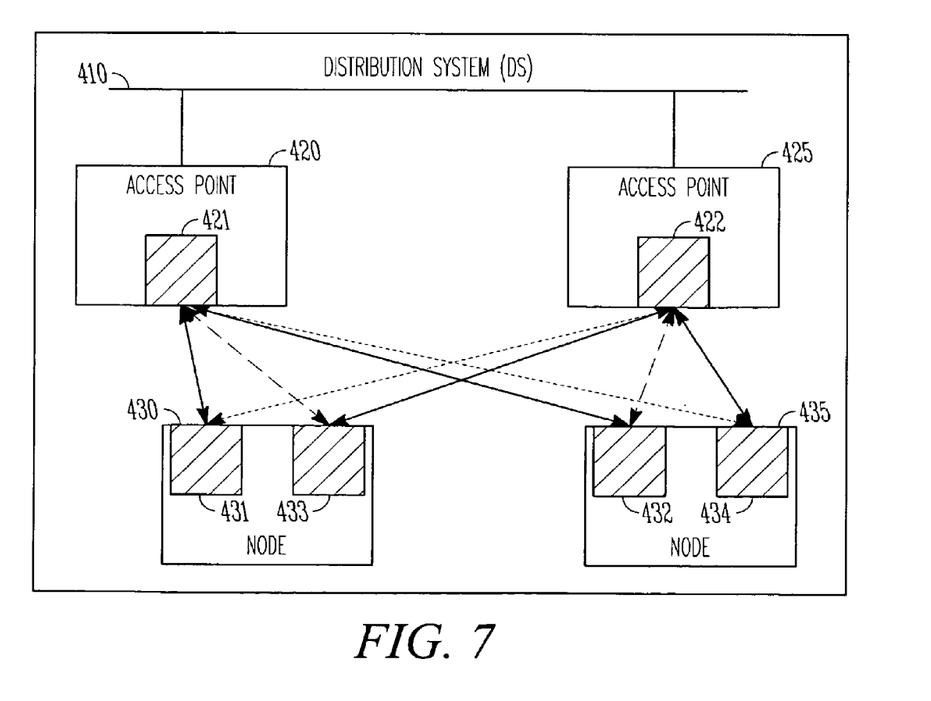

In another embodiment, a redundant APs concept is disclosed (option 6 in FIG. 3) with the APs' BSSs intersecting so that the nodes would be able to communicate with both the APs as shown in FIG. 7. This embodiment provides tolerance to faults arising due to failure of NICs on the nodes, failure of APS, and also provides data replication opportunity. Duplicate packet management can be taken up at the upper layers. In this embodiment, the different paths between nodes 430 and node 435 would include the following:

Path1: Node430 NIC 431→AP NIC 421→AP NIC 422→Node 435 NIC 432
Path2: Node430 NIC 431→AP NIC 421→AP NIC 422→Node 435 NIC 434
Path3: Node430 NIC 433→AP NIC 421→AP NIC 422→Node 435 NIC 432
Path4: Node430 NIC 433→AP NIC 421→AP NIC 422→Node 435 NIC 434
Path5: Node430 NIC 431→AP NIC 422→Node 435 NIC 432
Path6: Node430 NIC 431→AP NIC 422→Node 435 NIC 434
Path7: Node430 NIC 433→AP NIC 421→Node 435 NIC 432
Path8: Node430 NIC 433→AP NIC 421→Node 435 NIC 434

The NICs on the two APs would preferably be operating on non-overlapping channels. The redundant NICs on the nodes can be associated with two different APs as their coverage areas overlap as shown in FIG. 7. The dashed and the dotted lines show the other options available in the event of the failure of the NIC on the node and the AP failures respectively.

In the embodiments of option 7 and option 8 of FIG. 3, any given node is associated with more than one AP over non-overlapping channels. The basic topological assumption here is that the BSSs partially overlap and also the IBSS and ESS networks can co-exist in the same physical space with other ESS networks. Every node intended to maintain link redundancy will have redundant NICs (i.e., two separate cards). Each of these NIC cards is associated with different APs. In this embodiment, any fault tolerant node (i.e., a node with two NICs) would have two communication links. Also, the APs are provided with dual interfaces that are used to communicate with the fault tolerant nodes. Both of these interfaces on the APs can operate simultaneously over two non-overlapping channels.

Figure 8:
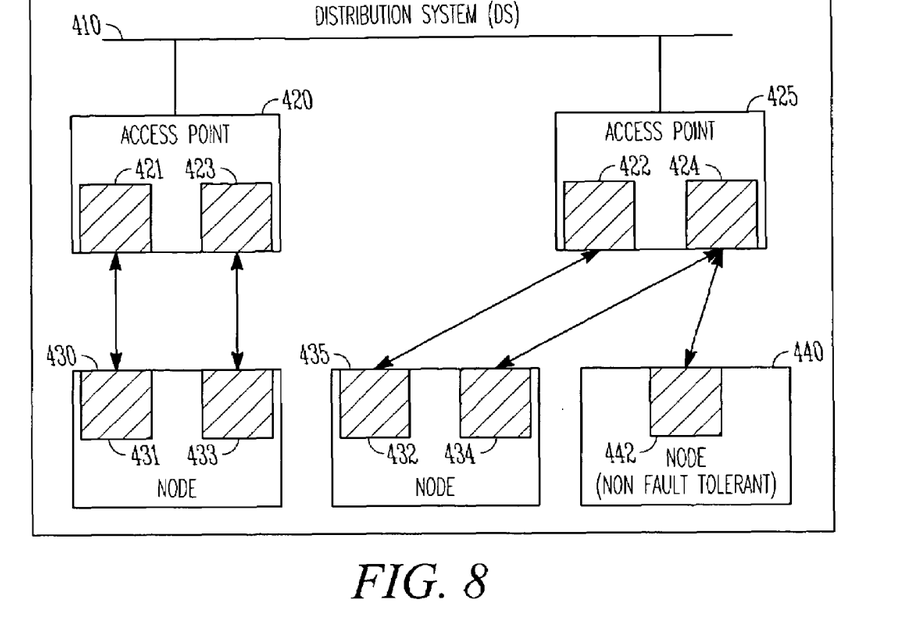

One manner of realizing the ideas represented by option 7 in FIG. 3 is that every node and AP has two wireless interfaces that are beneficially operating on non-overlapping channels as shown in FIG. 8. As shown in FIG. 8 (which covers option 7), both interfaces of the nodes are associated with the respective interfaces of the AP. There are at least two ways in which this embodiment can be implemented. First, both the communication links are active (both interfaces of the nodes and APs). The node transmits its packets on both of these links. However, the duplicate packet management can be done either by the AP or it can be done at the upper layers as well. Second, only one communication link (so called the primary link) can be active at a time and the other link (so called the secondary) is activated only in the event of the failure of the primary link. However, the channel frequency for communication by the APs and the nodes is decided beforehand. This embodiment provides tolerance to faults arising from link availability, channel congestion, and NIC card failure on either the AP or on the node. However, it does not address the issue of AP failure. In this embodiment, there are four paths between any two fault tolerant nodes. Therefore, referring again to FIG. 8, the different paths existing between nodes 430 and 435, include:

Path1: Node430 NIC 431→AP 420 NIC 421→AP 425 NIC 422→Node 435 NIC 432
Path2: Node430 NIC 431→AP 420 NIC 421→AP 425 NIC 424→Node 435 NIC 434
Path3: Node430 NIC 433→AP 420 NIC 423→AP 425 NIC 422→Node 435 NIC 432
Path4: Node430 NIC 433→AP 420 NIC 423→AP 425 NIC 424→Node 435 NIC 434

Similarly, two paths exist between a fault tolerant node and a non-fault tolerant node. Specifically, referring to FIG. 8, the paths between node 435 and node 440 are as follows:

Path1: Node435 NIC 432→AP 425 NIC 422→AP 425 NIC 424→Node 440 NIC 442
Path2: Node435 NIC 434→AP 425 NIC 424→Node 440 NIC 442

It is noteworthy that a non-fault tolerant node is authenticated or associated to only one AP at any given point in time. However, a shortcoming of this embodiment is that it cannot address AP failure. However, if the architecture incorporates overlapping BSS's, even the AP failure can be handled.

Figure 9:
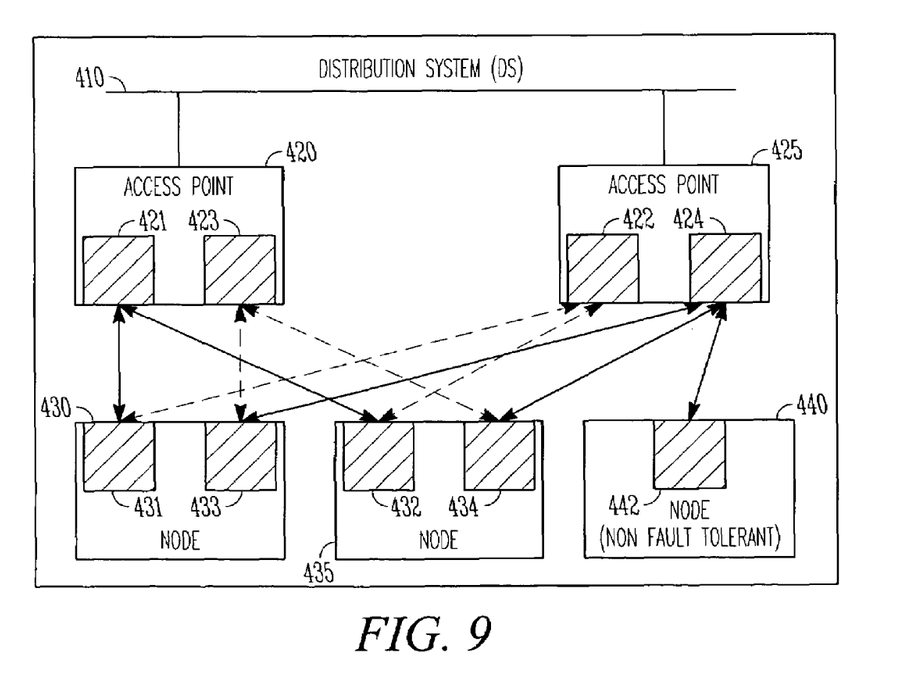

In order to cover AP failure under the purview of fault tolerance, an architecture such as that illustrated in FIG. 9 may be implemented (Option No. 8 in FIG. 3). In this embodiment, the fault tolerant nodes are associated with different APs via different interfaces (which preferably operate over non-overlapping channels). The fault tolerant nodes are in the coverage of both the APs. To achieve better fault tolerance, one interface of a node is associated with one AP using one of the channels and the other interface of the same node is associated with another AP on a channel which is non-overlapping with the first interface. Consequently, even if one of the APs fails, the node can still communicate with the rest of the network through its communication link with another AP.

In the event of a failure of both the links of a node with respective APs, the interfaces will re-associate with the interfaces of other APs on corresponding channels. This is shown in FIG. 9 by the dashed lines. The interface cards are pre-authenticated with the corresponding channel of another AP during initialization phase. This assists in reducing the re-association time with that channel. In this embodiment, all the NICs of the nodes and the APs are functionally active all the time. This embodiment is tolerant to faults induced due to failure of the link (path diversity), congestion on the link, failure of NICs on APs/nodes (frequency diversity), and also the failure of the APs themselves. In this embodiment, eight paths exist between any two fault tolerant nodes. As illustrated in FIG. 9, the existing paths between node 430 and node 435 are as follows:

Path1: Node430 NIC 431→AP 420 NIC 421→AP 425 NIC 422→Node 435 NIC 432
Path2: Node430 NIC 431→AP 420 NIC 421→AP 425 NIC 424→Node 435 NIC 434
Path3: Node430 NIC 431→AP 420 NIC 421→AP 420 NIC 423→Node 435 NIC 434
Path4: Node430 NIC 431→AP 420 NIC 421→Node 435 NIC 432
Path5: Node430 NIC 433→AP 420 NIC 423→Node 435 NIC 434
Path6: Node430 NIC 433→AP 420 NIC 423→AP 425 NIC 424→Node 435 NIC 434
Path7: Node430 NIC 433→AP 420 NIC 423→AP 425 NIC 422→Node 435 NIC 432
Path8: Node430 NIC 433→AP 420 NIC 423→AP 420 NIC 421→Node 435 NIC 432

Similarly, between a fault tolerant node and a non-fault tolerant node, four paths exist. For example, the available paths between node 435 and node 440 are as follows:
Path1: Node435 NIC 432→AP 420 NIC 421→AP 425 NIC 424→Node 440 NIC 442
Path2: Node435 NIC 432→AP 425 NIC 422→AP 425 NIC 424→Node 440 NIC 442
Path3: Node435 NIC 434→AP 425 NIC 424→Node 440 NIC 442
Path4: Node435 NIC 434→AP 420 NIC 423→AP 425 NIC 424→Node 440 NIC 442

One of the advantages to this embodiment is the degree to which the fault tolerance is provided. As depicted above, eight different paths are available between any two fault tolerant nodes. Also, the scenarios of AP failure are taken care of in this embodiment. However, an associated disadvantage could be the fact that all the four NICs (two each on AP and the fault tolerant nodes) are active at any given point in time. Because of this, two APs would be operating on two identical channels (interfaces 1 of AP1 and AP2 and also interfaces 2 of AP1 and AP2, similarly the interfaces on the wireless nodes) which may reduce the number of nodes that can be operated in that region over those particular channels. This is due to the fact that two identical channels are operational in the same region/physical space that is contended for by the devices belonging to the respective channels.

Figure 10:
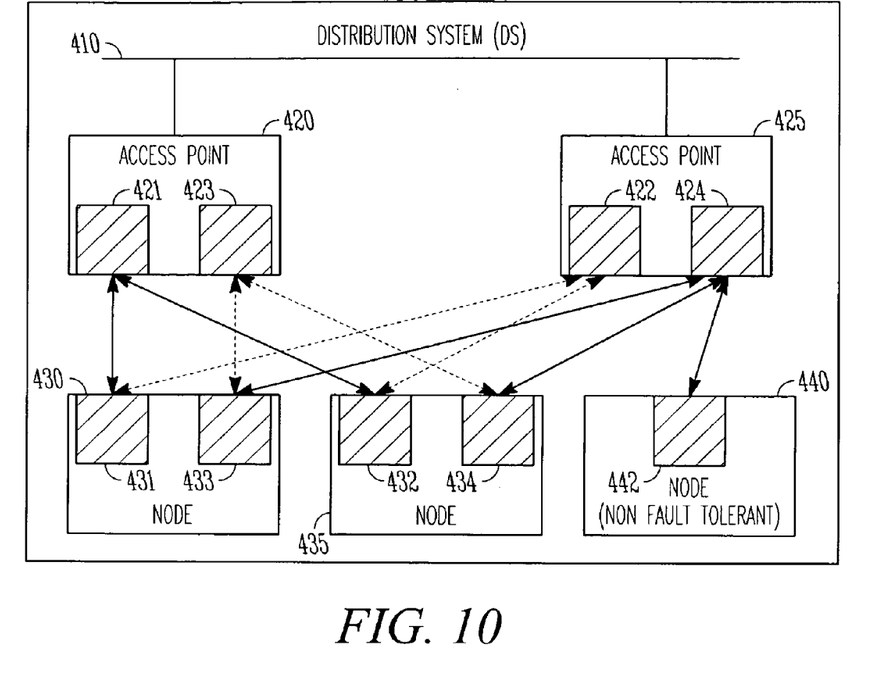

An embodiment that may overcome the disadvantage of the previous architecture is illustrated in FIG. 10. The architecture in FIG. 10 is similar to the architecture in FIG. 9 except that in FIG. 10 all the NICs of an AP are not functioning at the same time. That is, one of the NICs is active while the other NIC is inactive. As shown in FIG. 10, interface 1 (NIC 421) of AP 420 is active while interface 2 (NIC 423) is inactive and for AP 425 interface 2 (NIC 424) is active whereas interface 1 (NIC 422) is inactive (wherein the inactive status is shown by dotted lines). The inactive channel (which is preferably non-overlapping with respect to the other NICs on that AP) of APs gets activated only if the corresponding channel of the other AP fails. There has to be a mechanism provided in the APs which determines this failure of channel and intimates the other APs to activate the corresponding channel. Initially, when the node gets associated with the two APs, the node decides its preferred link by comparing the link quality of the two links. This embodiment provides tolerance to faults induced due to failure of the link, congestion over the link, failure of the NICs on the APs and nodes, and also the failure of the APs. In this embodiment, since only one of the two interfaces on each device (node and AP) is active, effectively only 4 (out of the maximum of 8) paths exist between any two fault tolerant nodes. Referring to FIG. 10, the paths between node 430 and node 435 are as follows:
Path1: Node430 NIC 431→AP 420 NIC 421→Node 435 NIC 432
Path2: Node430 NIC 431→AP 420 NIC 421→AP 425 NIC 424→Node 435 NIC 434
Path3: Node430 NIC 433→AP 425 NIC 424→Node 435 NIC 434
Path4: Node430 NIC 433→AP 425 NIC 424→AP 420 NIC 421→Node 430 NIC 431

Similarly, two paths exist between a fault tolerant node and a non-fault tolerant node. Referring again to FIG. 10, the paths between node 435 and node 440 are as follows:
Path1: Node435 NIC 432→AP 420 NIC 421→AP 425 NIC 424→Node 440 NIC 442
Path2: Node435 NIC 434→AP 425 NIC 424→Node 440 NIC 442

As it is evident, this embodiment addresses the disadvantages of the embodiments of FIGS. 8 and 9. A disadvantage of the embodiment of FIG. 10 might be the activation of redundant NICs in the event of a failure. This might add to the delay in communication. Thus, the choice among the different embodiments can be made based on the degree of fault tolerance desired in the system. For example, if an application is designed that demands link diversity on both the APs and the nodes, and also demands AP diversity, option no. 8 in FIG. 3 would be appropriate. A combination of these basic fault tolerant options would result in several hybrid architectures which increases the scope of the fault tolerance provided to the networks.

In the present disclosure, middleware that resides on top of the medium access control (MAC) layer of the nodes and APs is disclosed, and the role of the middleware is to monitor the health of the link and channel for each of the network interfaces on the device, put the packets on desired interfaces (depending on whether data is transmitted on both the interfaces or only one interface), and eliminate the duplicate packets when both the network interfaces are working (only in case of APs). On the other hand, if only one network interface is working at any point in time, the middleware performs the job of switching between the network interfaces based on the link quality. Thus, the middleware monitors the health of the link/channel associated with each network interface before taking any decisions regarding transmission of data on those interfaces. Similarly, the middleware on the AP also shares the link quality information with the other APs so that in the event of its failure, the redundant AP can take charge of the network.

The above disclosure and description focus on achieving fault tolerance through dual redundancy (with two NICs on APs and nodes and different variants of the same). However, the disclosure is not limited, and the concept can be extended to n-level redundancy.

Figure 11:
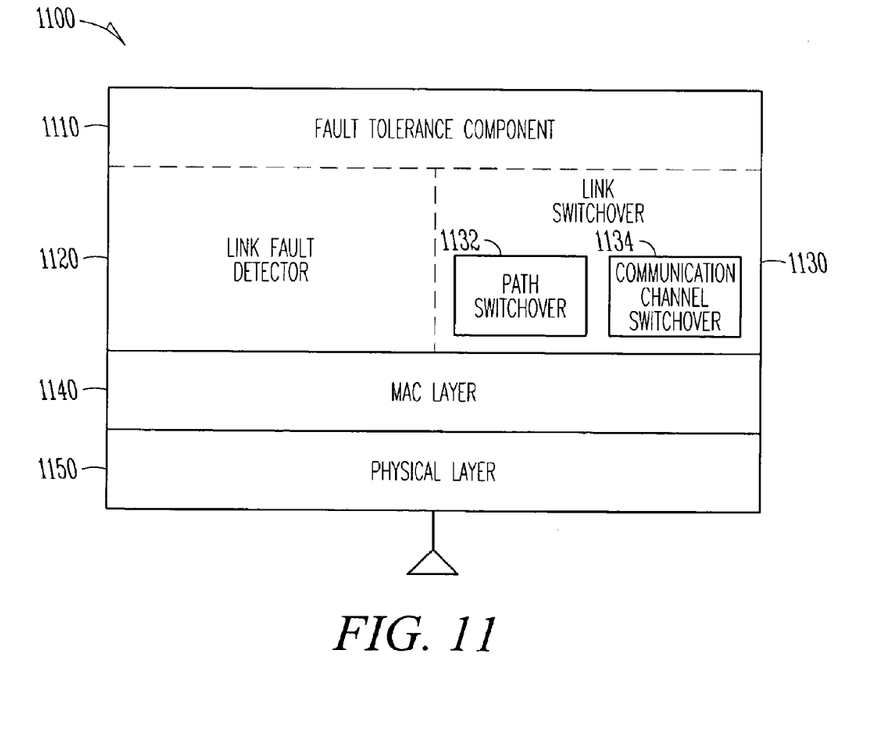
FIG. 11 illustrates an example embodiment of a fault tolerant architecture of a wireless network.

In order to achieve the desired fault tolerant properties explained above, the architecture of the fault tolerant nodes should be modified slightly as illustrated in FIG. 11. There is a physical layer 1150, and on top of the MAC layer 1140, there is a fault tolerant layer 1110 that includes two blocks— link fault detector 1120 (LFD) and the link switch over 1130 (LSO) components. The LSO may include a path switchover 1132 and/or a communication channel switchover 1134. The LFD 1120 is primarily used to detect the non-availability of the given communication link. The LFD 1120 can perform this task based on any combination of the following options. It is noted that are some of the options for the LFD 1120 to operate. The list can nevertheless be exhaustive.
  1. Received Signal Strength Indication (RSSI)—This can be a good measure for the link health since it acknowledges the presence of noise or interference in the operating channel.
  2. Sudden drop in SNR value of the link—Signal strength of a signal from an AP is available at the lower layer of the protocol stack. From the signal strength, the SNR value can be determined in decibels. Sudden drop in the SNR value can be an indication of link or channel failure.
  3. The number of packets waiting for the medium in the transmission/re-transmission queue.
  4. The total number of re-transmissions—This could be a measure to identify AP failure or congestion in the channel.
  5. The number of acknowledgment packet failures observed by the transmitting nodes indicate the possibility of either channel failure or AP failure.

Based on these observations, once the LFD 1120 determines that the given link is unusable, the LSO 1130 switches over to the redundant link based on the architecture alternatives in the disclosed embodiments. The fault tolerant layer 1110 in association with 1120 and 1130 as shown in FIG. 11 may perform the following functionalities:
  1. The middle layer may control the initial association process. That is, it has to make sure that the two NIC cards are associating with two different APs over two non-overlapping channels so that maximum fault tolerance can be achieved.
  2. It should have the fault detection mechanism to detect all the possible failure modes listed in FIG. 2 and communicate the same to the operator.
  3. In the event of a failure, the middleware should be capable of switching the traffic to the backup link without affecting the application.

Figure 12:
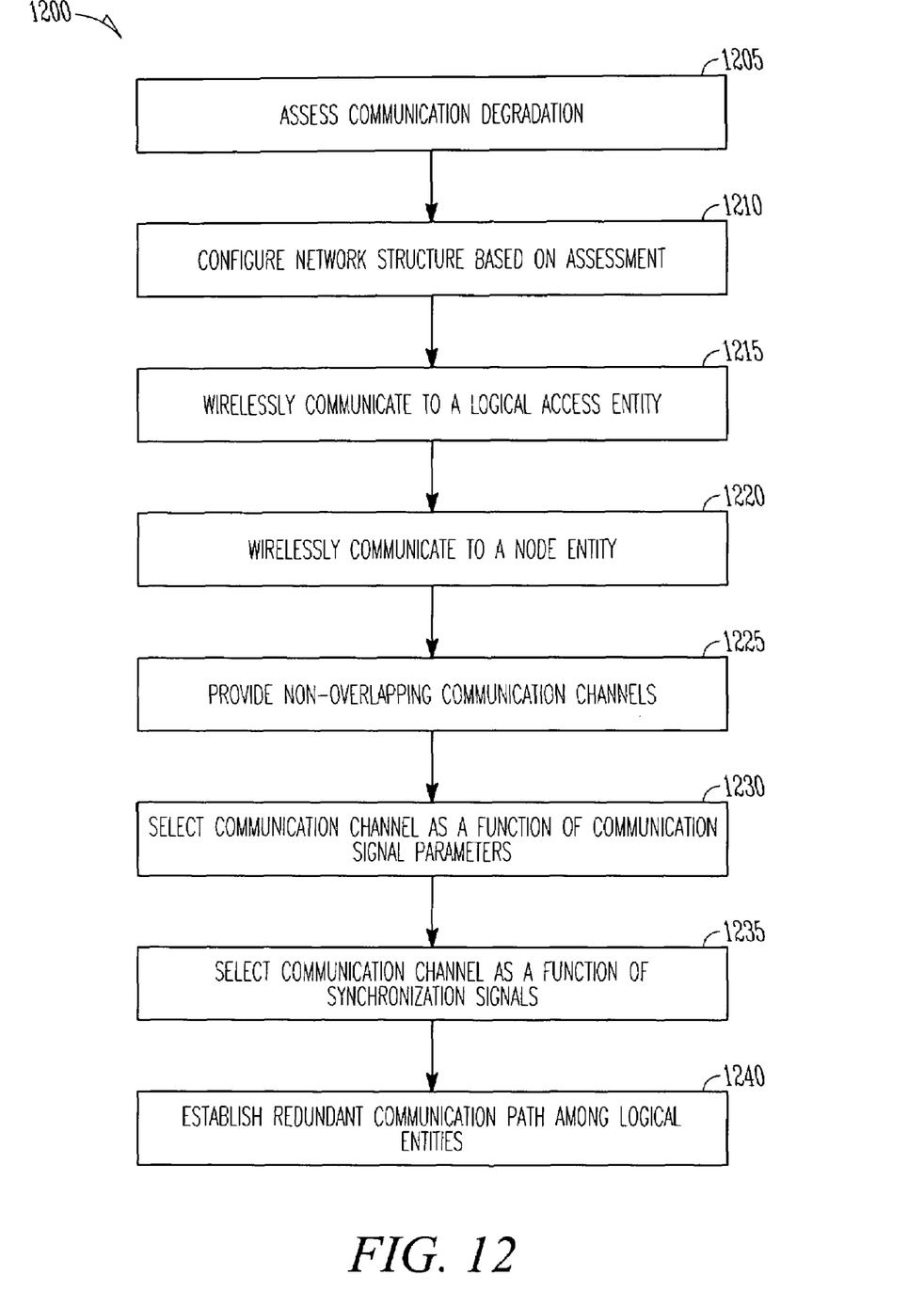
FIG. 12 illustrates a flowchart of an example embodiment of a process to provide a wireless network with fault tolerance.

FIG. 12 illustrates in flowchart form an example embodiment of a process 1200 to provide a wireless network with fault tolerance. At 1205, an assessment is made on the effect of a communication degradation between any of the logical communication entities of the network. At 1210, the network infrastructure is configured based on that assessment. In this process 1200, the infrastructure includes redundant wireless communication between the logical communication entities, thereby providing the fault tolerance within the network. At 1215, the redundant wireless communication involves wirelessly communicating to a logical access entity of the logical communication entity, and at 1220, the redundant wireless communication involves wirelessly communicating to a node entity of the logical communication entity. In the process 1200, the logical communication entity may be within a BSS of the wireless network or an ESS of the wireless network, and the logical access entity may include a wireless network interface card. At 1225, a plurality of non-overlapping communication channels is provided to the logical communication entity. At 1230, the redundant wireless communication channel is selected as a function of communication signal parameters. These communication signal parameters may include one or more of a signal to noise ratio, a received signal strength, network traffic density, and an acknowledgment of a failure. Further, at 1235, the redundant wireless communication channel is selected as a function of availability of one or more synchronization signals transmitted from one or more of the logical access entities. At 1240, a redundant communication path is established among the logical communication entities. The logical communication entities may include middleware that is configured to recognize communication degradation associated with any of the communication entities. The middleware may further be configured to switch communication among the logical communication entities.

Figure 13:
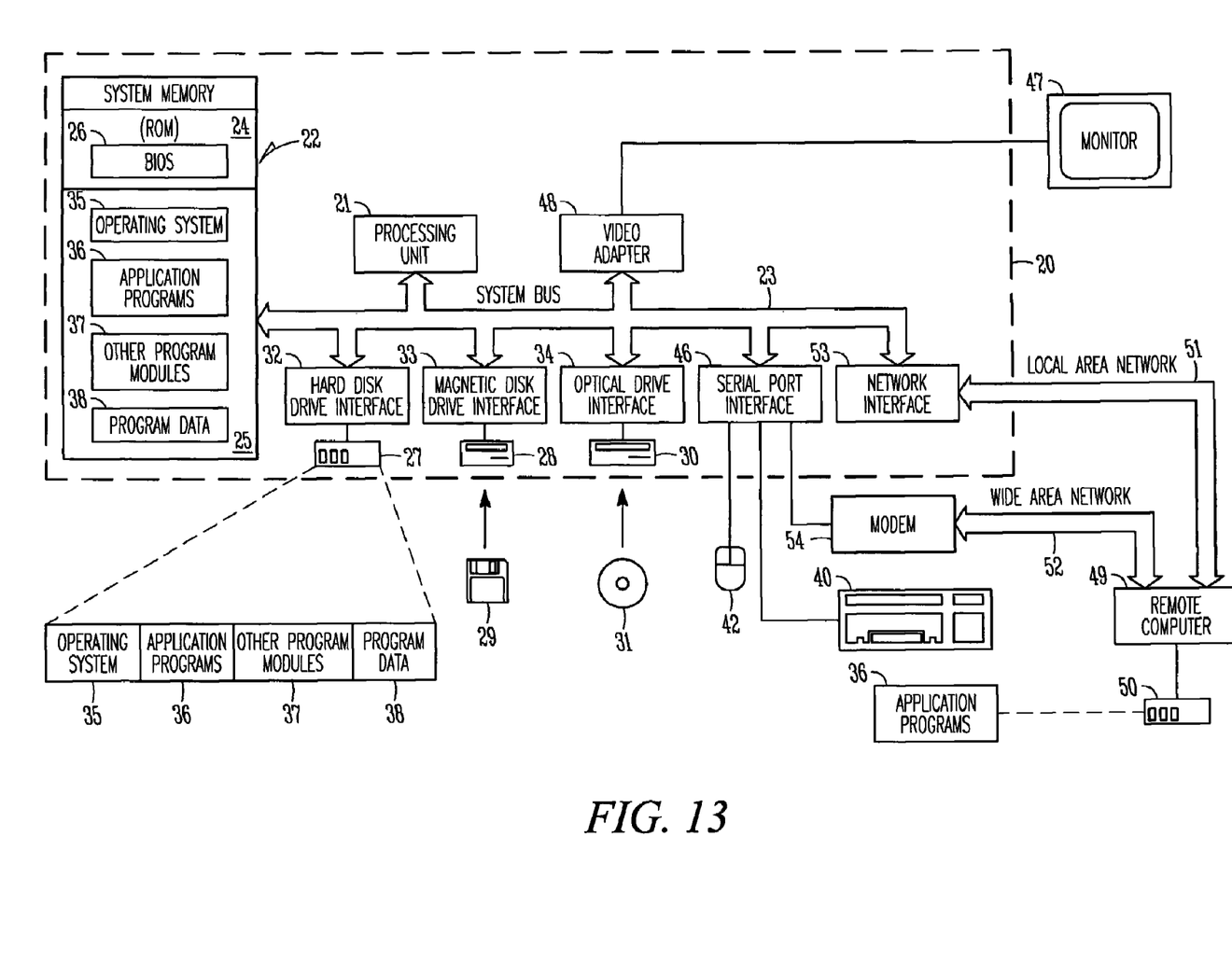
FIG. 13 illustrates an example embodiment of a computer architecture in connection with which one or more embodiments of the present disclosure may operate.

FIG. 13 is an overview diagram of a hardware and operating environment in conjunction with which embodiments of the invention may be practiced. The description of FIG. 13 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 13, a hardware and operating environment is provided that is applicable to any of the servers and/or remote clients shown in the other Figures.

As shown in FIG. 13, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 13 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A tangible machine readable storage medium comprising instructions for executing a method comprising:
    assessing an effect of a communication degradation between any of two or more logical communication entities of a network infrastructure;
    configuring said network infrastructure as a function of said assessment;
    wherein said infrastructure comprises redundant wireless communication between said logical communication entities, thereby providing fault tolerance within said network; and
    wherein said redundant wireless communication comprises providing a plurality of non-overlapping communication channels to said logical communication entity;
    selecting said redundant wireless communication channels as a function of communication signal parameters, said communication signal parameters including one or more of a signal to noise ratio, a received signal strength, network traffic density, and an acknowledgment of a failure; and selecting said redundant wireless communication channels as a function of availability of one or more synchronization signals transmitted from one or more logical access entities.

2. The machine readable medium of claim 1, wherein said redundant wireless communication further comprises wirelessly communicating to a logical access entity of said logical communication entity.

3. The machine readable medium of claim 2, wherein said logical communication entity is within a basic service set of said wireless network.

4. The machine readable medium of claim 2, wherein said logical communication entity is within an extended service set of said wireless network.

5. The machine readable medium of claim 1, wherein said redundant wireless communication comprises wirelessly communicating to a node entity of said logical communication entity.

6. The machine readable medium of claim 1, wherein said logical access entity comprises a wireless network interface card.

7. The machine readable medium of claim 1, further comprising establishing a redundant communication path among said logical communication entities.

8. The machine readable medium of claim 1, wherein said logical communication entity comprises middleware configured to recognize communication degradation associated with any of said communication entities.

9. The machine readable medium of claim 8, wherein said middleware is further configured to switch communication among said logical communication entities.

* * * * *